United States Patent
Jalali et al.

(10) Patent No.: US 11,620,624 B2
(45) Date of Patent: Apr. 4, 2023

(54) ENERGY-EFFICIENT SYSTEMS AND METHODS FOR PRODUCING AND VENDING ICE

(71) Applicant: Walmart Apollo, LLC, Bentonville, AR (US)

(72) Inventors: Rohit Jalali, Bentonville, AR (US); Jeffrey B. Ferrell, Centerton, AR (US); Sonney George, Bentonville, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 247 days.

(21) Appl. No.: 17/166,272

(22) Filed: Feb. 3, 2021

(65) Prior Publication Data

US 2021/0241252 A1  Aug. 5, 2021

Related U.S. Application Data (60) Provisional application No. 62/970,463, filed on Feb. 5, 2020.

(51) Int. Cl.
*G06Q 20/20* (2012.01)
*G06Q 10/06* (2012.01)
(Continued)

(52) U.S. Cl.
CPC ......... *G06Q 20/203* (2013.01); *B65B 25/007* (2013.01); *F25C 5/24* (2018.01);
(Continued)

(58) Field of Classification Search
CPC .............................. G06Q 20/20; G06Q 10/06
(Continued)

(56) References Cited

U.S. PATENT DOCUMENTS 3,630,045 A  12/1971  Lunde
4,417,671 A  11/1983  Kawasaki
(Continued)

FOREIGN PATENT DOCUMENTS

CA  2335057 C  2/2008
CA  2673824 C  6/2012
(Continued)

OTHER PUBLICATIONS

Kooler Ice, Inc.; "IM600 & IM600XL"; < https://www.koolerice.com/im600-ice-vending-machine/>; available at least as early as Jul. 9, 2019; pp. 1-3.

*Primary Examiner* — Nga B Nguyen
(74) *Attorney, Agent, or Firm* — Fitch, Even, Tabin & Flannery LLP (57) ABSTRACT

Systems and methods are provided herein for producing and vending ice in an energy-efficient manner. A system for producing and vending ice comprises: an ice-making device configured to manufacture ice; a reservoir coupled to the ice-making device and configured to store the manufactured ice manufactured; and a control circuit communicatively coupled to the ice-making device, the control circuit configured to: determine a beginning ice inventory at a first time; determine a predicted ice demand for a first period, wherein the predicted ice demand is a function of at least a historical factor, a weather factor, a customer social event factor, and a public social event factor; determine an ice manufacturing quantity based on the beginning ice inventory, the predicted ice demand, and a manufacturing capacity of the ice-making device; and cause the ice-making device to produce an amount of ice consistent with the determined ice manufacturing quantity.

20 Claims, 4 Drawing Sheets

(51) Int. Cl.
*G06Q 50/04* (2012.01)
*G06Q 50/06* (2012.01)
*G06Q 10/0631* (2023.01)
*G07F 9/10* (2006.01)
*F25C 5/20* (2018.01)
*G07F 13/00* (2006.01)
*B65B 25/00* (2006.01)
*G06Q 20/18* (2012.01)

(52) U.S. Cl.
CPC ....... *G06Q 10/06315* (2013.01); *G06Q 20/18* (2013.01); *G06Q 50/04* (2013.01); *G06Q 50/06* (2013.01); *G07F 9/105* (2013.01); *G07F 13/00* (2013.01); *F25C 2600/04* (2013.01)

(58) Field of Classification Search
USPC ....................................................... 705/7.25
See application file for complete search history.

(56) References Cited

U.S. PATENT DOCUMENTS

| | | | |
|---|---|---|---|
| 4,932,223 A | 6/1990 | Paul | |
| 5,953,925 A | 9/1999 | Mueller | |
| 5,974,823 A | 11/1999 | Banno | |
| 6,056,046 A | 5/2000 | Goldstein | |
| 6,058,732 A | 5/2000 | Kato | |
| 6,068,228 A | 5/2000 | Kobayashi | |
| 6,076,749 A | 6/2000 | Moore | |
| 6,101,833 A | 8/2000 | Suzuki | |
| 6,109,055 A | 8/2000 | Kato | |
| 6,134,907 A | 10/2000 | Mueller | |
| 6,148,620 A | 11/2000 | Kumagai | |
| 6,153,105 A | 11/2000 | Tadlock | |
| 6,161,396 A | 12/2000 | Allison | |
| 6,179,045 B1 | 1/2001 | Lilleaas | |
| 6,196,007 B1 | 3/2001 | Schlosser | |
| 6,282,909 B1 | 9/2001 | Newman | |
| 6,286,331 B1 | 9/2001 | Lee | |
| 6,286,332 B1 | 9/2001 | Goldstein | |
| 6,311,501 B1 | 11/2001 | Allison | |
| 6,318,094 B1 | 11/2001 | Yundt, Jr. | |
| 6,339,930 B2 | 1/2002 | Horey | |
| 6,347,529 B1 | 2/2002 | Yamamoto | |
| 6,349,556 B1 | 2/2002 | Barnett | |
| 6,349,557 B1 | 2/2002 | Gresham | |
| 6,401,467 B1 | 6/2002 | Horey | |
| 6,405,553 B1 | 6/2002 | Willett | |
| 6,414,301 B1 | 7/2002 | Borg, Jr. | |
| 6,425,258 B1 | 7/2002 | Barnett | |
| 6,434,964 B1 | 8/2002 | Tomiyama | |
| 6,477,846 B2 | 11/2002 | Yundt, Jr. | |
| 6,557,351 B1 | 5/2003 | Ghedini | |
| 6,581,393 B2 | 6/2003 | Newman | |
| 6,588,219 B2 | 7/2003 | Zevlakis | |
| 6,601,399 B2 | 8/2003 | Kuroyanagi | |
| 6,609,387 B2 | 8/2003 | Sasaki | |
| 6,612,126 B2 | 9/2003 | Kawasumi | |
| 6,647,739 B1 | 11/2003 | Kim | |
| 6,681,580 B2 | 1/2004 | Shedivy | |
| 6,688,130 B1 | 2/2004 | Kim | |
| 6,688,131 B1 | 2/2004 | Kim | |
| 6,691,529 B2 | 2/2004 | Sugie | |
| 6,694,752 B2 | 2/2004 | Nomura | |
| 6,705,107 B2 | 3/2004 | Schlosser | |
| 6,725,675 B2 | 4/2004 | Kampert | |
| 6,742,351 B2 | 6/2004 | Kim | |
| 6,845,703 B2 | 1/2005 | Ugolini | |
| 6,857,284 B1 | 2/2005 | Brooks | |
| 6,895,767 B2 | 5/2005 | Hu | |
| 6,907,744 B2 | 6/2005 | Miller | |
| 6,912,868 B2 | 7/2005 | Sugie | |
| 6,915,647 B2 | 7/2005 | Tsuchikawa | |
| 6,920,764 B2 | 7/2005 | Zevlakis | |
| 6,938,428 B2 | 9/2005 | Onishi | |
| 6,952,937 B2 | 10/2005 | Choi | |
| 6,971,245 B2 | 12/2005 | Kuroyanagi | |
| 6,988,373 B2 | 1/2006 | Wakatsuki | |
| 6,993,929 B1 | 2/2006 | Funk | |
| 7,010,933 B2 | 3/2006 | Ishitomi | |
| 7,059,140 B2 | 6/2006 | Zevlakis | |
| 7,062,925 B2 | 6/2006 | Tsuchikawa | |
| 7,082,782 B2 | 8/2006 | Schlosser | |
| 7,127,909 B1 | 10/2006 | Brooks | |
| 7,152,424 B2 | 12/2006 | Shoukyuu | |
| 7,168,262 B2 | 1/2007 | Hirano | |
| 7,194,868 B2 | 3/2007 | Yoshida | |
| 7,204,091 B2 | 4/2007 | Allison | |
| 7,225,628 B2 | 6/2007 | Furukawa | |
| 7,243,508 B2 | 7/2007 | Sanuki | |
| 7,273,990 B2 | 9/2007 | Yoshida | |
| 7,281,385 B2 | 10/2007 | Wakatsuki | |
| 7,281,386 B2 | 10/2007 | McDougal | |
| 7,284,391 B2 | 10/2007 | Miller | |
| 7,290,725 B1 | 11/2007 | Brooks | |
| 7,296,425 B2 | 11/2007 | Goldstein | |
| 7,310,957 B2 | 12/2007 | Broadbent | |
| 7,343,749 B2 | 3/2008 | Tsuchikawa | |
| 7,406,838 B2 | 8/2008 | Wang | |
| 7,444,828 B2 | 11/2008 | Kadowaki | |
| 7,444,829 B2 | 11/2008 | Mori | |
| 7,536,867 B2 | 5/2009 | Kaga | |
| 7,540,161 B2 | 6/2009 | Broadbent | |
| 7,703,299 B2 | 4/2010 | Schlosser | |
| 7,743,618 B2 | 6/2010 | Kaga | |
| 7,765,814 B2 | 8/2010 | Goldstein | |
| 7,788,934 B2 | 9/2010 | Kodama | |
| 7,832,219 B2 | 11/2010 | Baranowski | |
| 8,042,344 B2 | 10/2011 | Morimoto | |
| 8,082,742 B2 | 12/2011 | Broadbent | |
| 8,322,152 B2 | 12/2012 | Goldstein | |
| 8,336,326 B2 | 12/2012 | Sasaki | |
| 8,365,951 B2 | 2/2013 | Jennison | |
| 8,375,738 B2 | 2/2013 | Kawasumi | |
| 8,469,232 B2 | 6/2013 | Jennison | |
| 8,528,357 B2 | 9/2013 | Kondo | |
| 8,661,843 B2 | 3/2014 | Klopp | |
| 8,677,774 B2 | 3/2014 | Yamaguchi | |
| 8,677,777 B2 | 3/2014 | Yamaguchi | |
| 8,844,312 B2 | 9/2014 | Yoshida | |
| 9,052,130 B2 | 6/2015 | Schlosser | |
| 9,146,049 B2 | 9/2015 | Yamaguchi | |
| 9,217,597 B2 | 12/2015 | Mueller | |
| 9,259,114 B2 | 2/2016 | Nevarez | |
| 9,291,381 B2 | 3/2016 | Nelson | |
| 9,316,426 B2 | 4/2016 | Almblad | |
| 9,389,009 B2 | 7/2016 | Olson, Jr. | |
| 9,714,783 B2 | 7/2017 | Maroli | |
| 9,784,491 B2 | 10/2017 | Choi | |
| 9,999,863 B2 | 6/2018 | Jeong | |
| 10,113,785 B2 | 10/2018 | Melton | |
| 10,161,664 B2 * | 12/2018 | Tadhani | F25C 5/00 |
| 11,113,921 B2 * | 9/2021 | Metzger | F25C 5/20 |
| 2005/0211768 A1 | 9/2005 | Stillman | |
| 2008/0140515 A1 * | 6/2008 | Godwin | G06Q 10/06 705/7.31 |
| 2016/0025398 A1 | 1/2016 | Seymour | |

FOREIGN PATENT DOCUMENTS

| | | |
|---|---|---|
| CA | 2665542 C | 7/2012 |
| CA | 2647682 C | 6/2013 |
| CA | 2705322 C | 9/2014 |
| CA | 2720137 C | 11/2015 |

* cited by examiner

ENERGY-EFFICIENT SYSTEMS AND METHODS FOR PRODUCING AND VENDING ICE

CROSS-REFERENCE TO RELATED APPLICATIONS

This application claims the benefit of U.S. Provisional Application No. 62/970,463, filed Feb. 5, 2020, which is incorporated herein by reference in its entirety.

TECHNICAL FIELD

This invention relates generally to systems and methods for producing and vending ice, and more particularly, to automated systems and methods for producing and vending ice in an energy-efficient manner.

BACKGROUND

Bagged ice is generally sold at retail facilities such as grocery stores, gas stations, and the like. The bagged ice sold at these retail facilities is often shipped to the facility and stored on-site in freezers until it is sold or otherwise used. However, shipping and storing large quantities of ice can be costly and energy intensive and does not provide flexibility for attending to dynamic changes in demand. Accordingly, there is a need for a system that produces and vends ice, particularly on-site, in an energy-efficient manner.

BRIEF DESCRIPTION OF THE DRAWINGS

Disclosed herein are embodiments of systems, apparatuses and methods pertaining to producing and vending ice in an energy-efficient manner. This description includes drawings, wherein.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to various embodiments, systems, apparatuses and methods are provided herein for producing and vending ice in an energy efficient manner. A system for producing and vending ice in an energy-efficient manner includes an ice an ice-making device configured to manufacture ice and a reservoir coupled to the ice-making device and configured to store the ice manufactured by the ice-making device. The system uses various data inputs and factors to predict an average ice demand for a given period in an area associated with the ice-making device and causes the ice-making device to generate enough ice to fill the reservoir and to cease ice manufacturing when a target inventory is achieved, thus reducing energy costs of keeping ice below freezing point. Exemplary inputs that may be used to predict a demand for ice for a given period in a particular area associated with the ice-making device may include, but are not limited to, data relating to past ice sales for the same time period, upcoming national and local holidays, festivals, sporting events, etc., data relating to customers' purchase history, shopping habits, social activity calendar, etc., and weather and/or temperature data. The system uses the various inputs and factors described herein to predict a demand for ice for a given period in a particular area associated with the ice-making device, thereby maximizing production efficiency and minimizing energy consumption associated with storing excess ice.

The system further includes a control circuit communicatively coupled to the ice-making device, the control circuit being configured to make various determinations with respect to, for example, ice inventory, ice demand, ice manufacturing quantity, and to control the ice-making device and components coupled thereto. In some approaches, the ice-making device, reservoir, and control circuit are housed in a standalone kiosk located outside of a retail facility.

The control circuit is configured to determine a beginning ice inventory at a first time, which, in some approaches, may be determined based on one or more sensors in the ice reservoir. In some approaches, the control circuit may determine the beginning ice inventory based on, for example, the previous beginning inventory, the amount of ice previously manufactured, and the previous ice demand. The control circuit is further configured to determine a predicted ice demand for a first period, wherein the predicted ice demand is a function of at least a historical factor, a weather factor, a customer social event factor, and a public social event factor. The control circuit then determines an amount of ice needed to be manufactured to achieve a target inventory (i.e., an ice manufacturing quantity) based on the beginning ice inventory, the predicted ice demand, and a manufacturing capacity of the ice-making device, and the control circuit causes the ice-making device to produce an amount of ice consistent with the determined ice manufacturing quantity. In some approaches, the ice manufacturing quantity is further determined based on an estimated energy cost of storing excess manufactured ice.

The system may further include a user interface communicatively coupled to the control circuit, the user interface being configured to allow a customer to select an amount of ice manufactured by the ice-making device. In some approaches, the user interface may form part of a standalone kiosk that houses the ice-making device, reservoir, and control circuit. Alternatively, or in addition, the user interface may form part of a customer's mobile electronic device such as, for example, a mobile phone or tablet. The system may further include a payment system communicatively coupled to the control circuit and the user interface, the payment system being configured to execute a payment transaction for an amount of ice selected by the customer. In some approaches, the control circuit is further configured to determine an ending inventory at a second time and to vary a price of the manufactured ice displayed on the user interface based on the ending inventory and an estimated energy cost associated with storing the manufactured ice forming the ending inventory.

The system may further include a packaging system coupled to the ice-making device and the control circuit, the packaging system being configured to individually package amounts of ice manufactured by the ice-making device. In some approaches, the control circuit instructs the packaging system to individually package various amounts of manufactured ice based on one or more of the factors associated with the predicted ice demand. In other approaches, the control circuit instructs the packaging system to package a particular amount of manufactured ice based on a customer's selection via the user interface.

The system may further include one or more of a historical database comprising data relating to past ice demand for determining the historical factor, a weather engine configured to collect and provide data for determining the weather factor, a customer database comprising data for determining the customer social event factor, and a public social event database comprising data for determining the public social event factor, which may be communicatively coupled to the control circuit associated with the ice-making device via a remote server.

The system may further include an inventory database communicatively coupled to the control circuit and configured to identify products historically associated with a purchase of ice. The control circuit may be configured to cause the user interface to display a suggested item for purchase based on one or more of the products historically associated with a purchase of ice, the data for determining the customer social event factor, and the data for determining the public social event.

Figure 1:
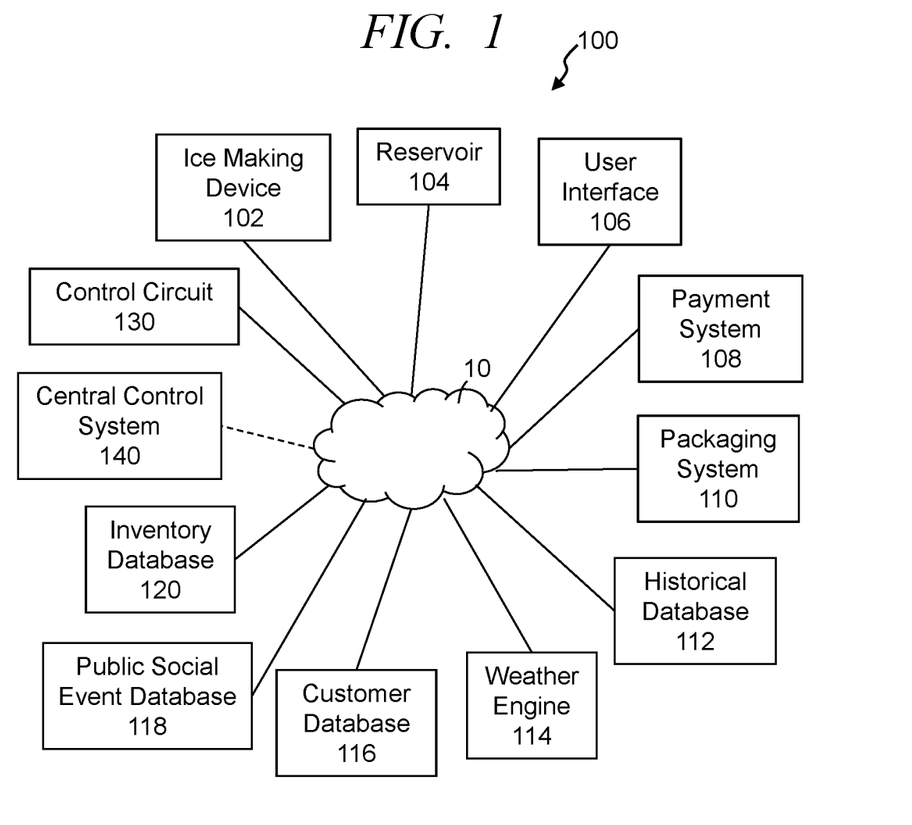
FIG. 1 is a block diagram of a system for producing and vending ice in accordance with several embodiments.
Figure 2:
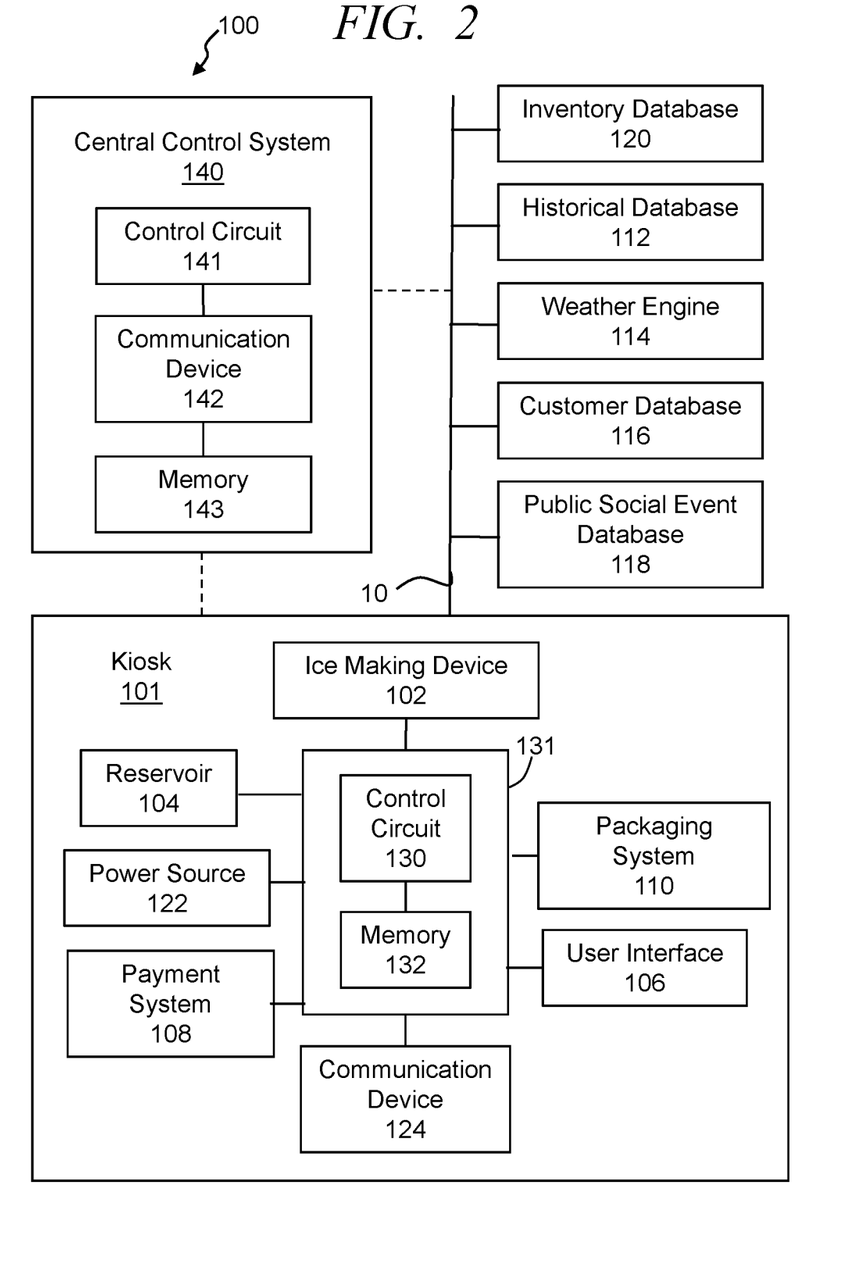
FIG. 2 is a block diagram of a system for producing and vending ice in accordance with several embodiments.
Figure 3:
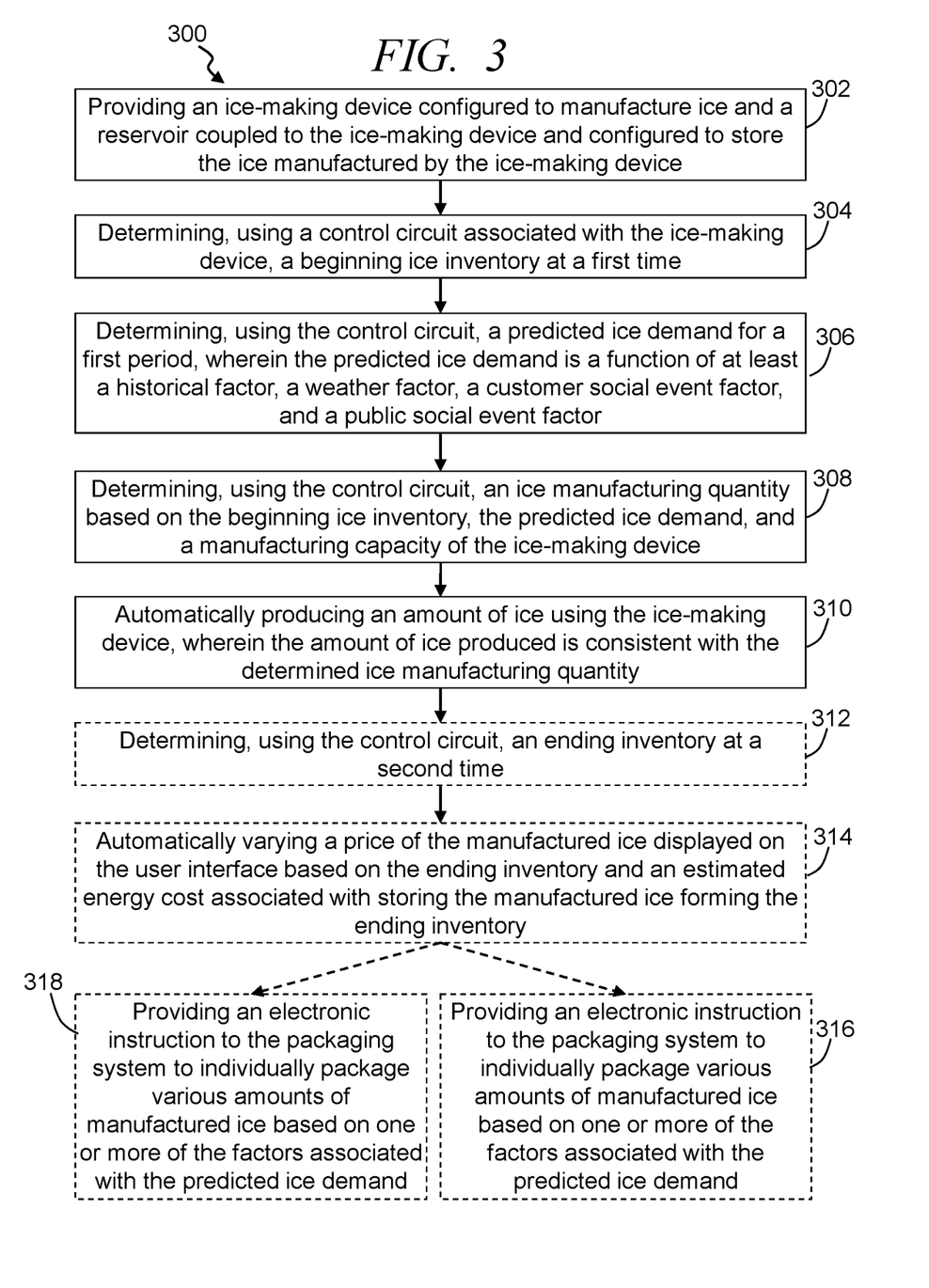
FIG. 3 is a flow diagram of a method for producing and vending ice in accordance with several embodiments.
Figure 4:
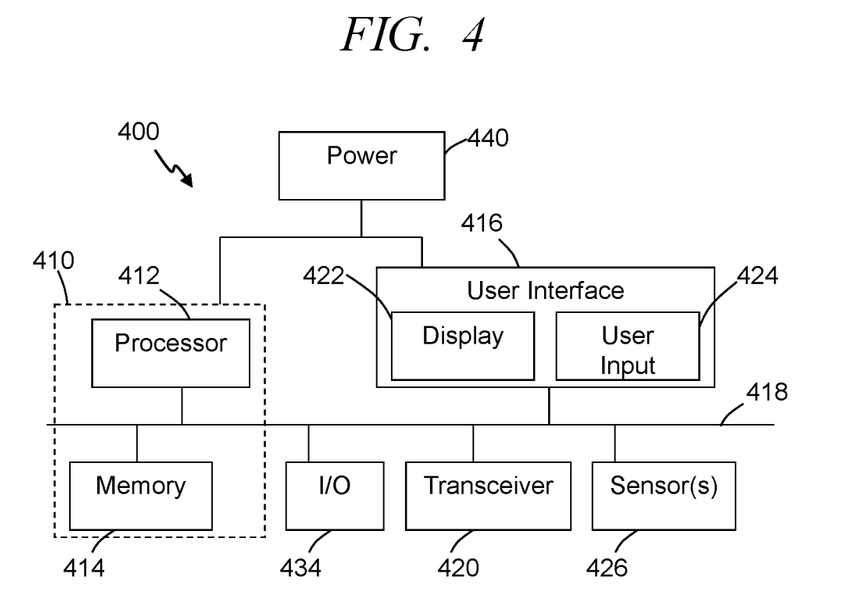
FIG. 4 is a block diagram of an exemplary system for use in implementing methods, techniques, devices, apparatuses, systems, servers, and sources for producing and vending ice in accordance with some embodiments.

FIGS. 1 and 2 are block diagrams of exemplary systems 100 for producing and vending ice in an energy-efficient manner. FIG. 1 illustrates an exemplary embodiment wherein various components of the system 100 may be communicably coupled via a network 10 such as a mobile network, a wireless network, a secured network, a private network, or the Internet. FIG. 2 illustrates an exemplary embodiment wherein certain components of the system 100 are housed in a standalone kiosk 101. FIG. 3 is a flow diagram of an exemplary method 300 for producing and vending ice in an energy-efficient manner. FIG. 4 is a block diagram of an exemplary system 400 for use in implementing methods, techniques, devices, apparatuses, systems, servers, and sources for producing and vending ice in an energy-efficient manner, Referring to FIGS. 1 and 2, exemplary systems for producing and vending ice in an energy-efficient manner are shown. The system 100 includes an ice-making device 102. The ice-making device may comprise any suitable device capable of making, producing, or otherwise manufacturing a quantity of ice and may include any components needed for making, producing, or otherwise manufacturing a quantity of ice including, for example, a self-contained refrigeration system, a water supply, a filtration system, a power source, etc.

A reservoir 104 is coupled to the ice-making device 102 and is configured to store the ice manufactured by the ice-making device 102. The reservoir 104 may have any suitable size, shape, and configuration depending on the size, shape, configuration and/or ice-manufacturing capability of the ice-making device 102. In some approaches, the reservoir 104 may be coupled to the ice-making device 102 via a hopper, which conveys the manufactured ice from the ice-making device 102 to the reservoir 104. The reservoir may also be insulated as appropriate and may be fitted with various sensors (e.g., temperature, weight, volume, etc.), which may transmit signals and/or data to a control circuit 130.

The control circuit 130 is communicatively coupled to the ice-making device 102. The control circuit 130 may form part of a control unit 131, which may also include a memory 132. In some approaches, the control unit 131 comprising the control circuit 130 and a memory 132 may be housed in the standalone kiosk 101 along with the ice-making device 102 and the reservoir 104, as illustrated in FIG. 2. The control circuit 130 may comprise a central processing unit, a processor, a microprocessor, and the like and may be configured to control the operating parts of the ice-making device 102 and any components coupled thereto. The control circuit 130 may be configured to execute computer readable instructions stored on the computer readable storage memory 132. The computer readable storage memory 132 may comprise volatile and/or non-volatile memory and have stored upon it a set of computer readable instructions which, when executed by the control circuit 130, causes the control circuit 130 to, for example, control the amount of ice manufactured by the ice-making device and to cause the ice-making device to manufacture a quantity of ice when one or more conditions are met. The control circuit may be further configured to determine an ice-inventory at a given time, which may be based on one or more algorithms, sensor data, etc. The control circuit 130 is also configured to predict a demand for ice for a given period, which may be based on one or more factors including a historical factor, a weather factor, a customer social event factor, and a public social event factor, and to determine an amount of ice to manufacture based on, for example, a beginning ice inventory, a predicted ice demand, and a manufacturing capacity of the ice-making device. In some approaches, the control circuit 130 may also consider the estimated energy cost of storing excess manufactured ice when determining the amount of ice to manufacture. The control circuit then causes the ice-making device 102 to produce an amount of ice consistent with the determined ice manufacturing quantity. In some embodiments, the computer executable instructions may cause the control circuit 130 of the to perform one or more steps in the methods and processes described with reference to FIG. 3 herein.

A communication device 124 may be associated with the control circuit 130. The communication device 124 may comprise a wireless communication device configured to allow the control circuit 130 (and the ice-making device 102 coupled thereto) to communicate with a remote system such as the central control system 140 and one or more databases over a network 10 such as a mobile network, a wireless network, a secured network, a private network, and the Internet. In some embodiments, the communication device 124 may comprise one or more of Wi-Fi transceiver, a mobile data network transceiver, a cellular network transceiver, a satellite network transceiver, and the like.

The system 100 may further include a user interface 106 communicatively coupled to the control circuit 130. The user interface 106 is configured to allow a customer to select for purchase an amount of ice manufactured by the ice-making device. The user interface 106 may comprise one or more user input/output devices configured to allow a customer to select at least an amount of ice manufactured by the ice-making device to purchase and/or submit payments for purchase. For example, a customer may arrive at an ice-making device 102, which may be located adjacent to a retail facility, and the customer may place an order for an amount of ice to purchase using the user interface 106. In some embodiments, the user interface 106 may comprise one or more of a touchscreen, a see-through touch screen, a keypad, one or more buttons, a display screen, a microphone, a speaker, and the like. In some embodiments, the user interface 106 is associated with the kiosk 101 that houses the ice-making device 102 and may be configured to display images and/or an ordering menu. In some embodiments, the user interface 106 may be displayed on a customer's mobile electronic device (e.g. as a mobile application, a web browser accessing a website, etc.), such as a mobile phone or tablet configured to communicate with the system 100 (in some approaches, via a remote server or central communication system) to provide a customer's item selection(s) and/or payment.

A payment system 108 may also be associated with the system 100. The payment system 108 is communicatively coupled to the control circuit 130 and the user interface 106 and is configured to execute a payment transaction for the amount of ice selected by the customer via the user interface 106. In some embodiments, the payment system 108 may be configured to receive payment via one or more of a cash receiver, a bank card reader, a mobile payment reader, a near field communication (NFC) transceiver, a Radio Frequency Identification (RFID) scanner, a biometrics reader, etc.

The system 100 may also include a packaging system 110 communicatively coupled to the control circuit 130. The packaging system 110 is coupled to the ice-making device 102 (and/or the reservoir 104 associated therewith), for example, by a dispensing arm. The packaging system 110 may include any suitable components for packaging amounts of ice manufactured by the ice-making device 102. In some approaches, the packaging system 110 may include an automated roll stock film system for packaging varying quantities of ice from the ice-making device 102 and/or the reservoir 104 continuously, periodically, or on-demand. In some approaches, the packaging system 110 may include premade bags of one or more sizes which are filled with an amount of ice from the ice-making device 102 and/or the reservoir 104. For example, when certain conditions are met (or when the control circuit 130 determines a need for bagged ice based on actual, predicted, or historical demand), the control circuit 130 may cause the packaging system 110 to package a certain number of bags of ice (which may contain the same or varying amounts of ice depending on the system employed) so that premade bags of ice are available for purchase during a particular period. Additionally, the control circuit 130 may cause the packaging system 110 to package a certain number of bags of ice (which may contain the same or varying amounts of ice depending on the system employed) in response to a purchase order from a customer received via the user interface 106.

The packaging system 110 described herein is configured such that fresh manufactured ice can be packaged and sold in any weight format. For example, in some approaches, the packaging system 110 is configured to package ice in bags of from about 2 to about 25 pounds of ice.

The system further includes a power source 122 coupled to the ice-making device 102 and/or components coupled thereto. In some embodiments, the power source 122 may comprise one or more of a rechargeable battery, a replaceable battery, a fuel cell, a solar panel, a fuel tanks, and a power grid connection. The power provided by the power source 122 may be used to power one or more of the ice-making device 102, control circuit 130, reservoir 104, user interface 106, payment system 108, packaging system 110, and communication device 124. In some embodiments, the ice-making device 102 may include a plug or other electrically conductive interface for connecting with an external source of electrical energy to recharge the power source 122.

In some approaches, the ice-making device 102 (and one or more of its associated components, including the control circuit 130, reservoir 104, user interface 106, payment system 108, packaging system 110, communication device 124, and/or power source 122) may form part of a stand-alone, self-service kiosk 101, as illustrated in FIG. 2. The kiosk 101 may be located in any suitable location. For instance, the kiosk 101 may be located inside of a retail facility, for example, near an exit of the facility. In other approaches, the kiosk may be located outside of the retail facility, for example, in a parking lot, and may be located near other outdoor point of service kiosks.

In some embodiments, the system may include a separate central control system 140, which is communicatively coupled to the control circuit 130, the ice-making device 102, and/or various components coupled thereto. The central control system 140 may comprise a control circuit 141, a memory 143, and a communication device 142. The central control system 140 may comprise one or more of a server, a central computing system, and the like. In some embodiments, the central control system 140 may comprise a system of two or more processor-based devices. The control circuit 141 may comprise a processor, a microprocessor, and the like and may be configured to execute computer readable instructions stored on a computer readable storage memory 143. The computer readable storage memory 143 may comprise volatile and/or non-volatile memory and have stored upon it, a set of computer readable instructions which, when executed by the control circuit 141, causes the central control system 140 to, for example, control the amount of ice manufactured by the ice-making device 102 and to cause the ice-making device 102 to manufacture a quantity of ice when one or more conditions are met. The control circuit may be further configured to determine an ice-inventory at a given time, which may be based on one or more algorithms, sensor data, etc. The control circuit is also configured to predict a demand for ice for a given period, which may be based on one or more factors including a historical factor, a weather factor, a customer social event factor, and a public social event factor, and to determine an amount of ice to manufacture based on, for example, a beginning ice inventory, a predicted ice demand, and a manufacturing capacity of the ice-making device 102. In some approaches, the control circuit may also consider the estimated energy cost of storing excess manufactured ice when determining the amount of ice to manufacture. The control circuit then causes the ice-making device 102 to produce an amount of ice consistent with the determined ice manufacturing quantity. In some embodiments, the computer executable instructions may cause the control circuit of the to perform one or more steps in the methods and processes described with reference to FIG. 3 herein.

The communication device 142 of the central control system 140 may comprise a network interface configured to communicate with one or more of the components of the system 100 via a network 10 such as the Internet, a private network, a secure network, a mobile network, and the like. In some embodiments, the communication device 142 may comprise a network adapter, a modem, a router, a wireless transceiver, a mobile network transceiver, and the like.

In some embodiments, the control circuit 130 and/or the central control system 140 may be coupled to one or more databases or remote components such as, for example, a historical database 112, a weather engine 114, a customer database 116, and a public social event database 118. In some approaches, the historical database 112, weather engine 114, customer database 116, and public social event database 118 are communicatively coupled to the control circuit 130 associated with the ice-making device 102 via a remote server. As described in more detail below, the control circuit 130 and/or the central control system 140 may use information stored in the historical database 112, weather engine 114, customer database 116, and public social event database 118 to determine factors for use in predicting a demand for ice for a given period.

The historical database 112 comprises data relating to past ice demand, such as, for example, previous ice sales data for a given date or period, which may be used to determine the historical factor. The data stored in the historical database 112 for use in determining the historical factor may be obtained from, for example, point of service kiosks associated with the retailer, inventory management systems, etc.

The weather engine 114 is configured to collect and provide data relating to current and/or predicted temperature, weather, etc., which may be used to determine the weather factor. The weather engine 114 may include one or more outdoor sensors in the vicinity of the ice-making device 102, the outdoor sensors being configured to collect data relating to current and/or predicted temperature and/or weather forecasts in the vicinity of the ice-making device 102. Alternatively, or in addition, the weather engine 114 may obtain data relating to current and/or predicted temperature and/or weather forecasts from one or more regional weather services. The data obtained from the weather engine 114 is useful because the demand for ice can fluctuate based on the weather and/or temperature. For example, weather and/or temperature can affect customer shopping habits, as well as participation in social, family, and public events, which can alter the need for ice in a given period. The weather and/or temperature can also impact energy costs associated with storing excess ice.

The customer database 116 stores data that may be useful for determining the customer social event factor such as, for example, customers' purchase history, shopping habits, social activity calendar, etc. In some approaches, the customer database 116 may be electronically linked to customers' user accounts, membership accounts, loyalty accounts, etc. and may periodically obtain and store from those accounts data relating to customers' purchase history, shopping habits, etc. In some approaches, the customer may provide certain information to the retailer, such as for example, their address, date of birth, etc. In some approaches, customers may create an electronic customer profile, which includes a social event calendar comprising birthdays, social gatherings, family events, etc. Alternatively, or in addition, customers may elect to link their user accounts, membership accounts, loyalty accounts, etc. to one or more third party electronic calendar applications, social media application, and the like, which may provide the customer database 116 with data relating to birthdays, social gatherings, family events, etc. The control circuit 130 and/or the central control system 140 is configured to obtain and utilize some or all of the data in the customer database 116, along with one or more additional factors described herein, to predict an ice demand for a given period for an ice-making device 102 having a given location.

The public social event database 118 comprises data for determining the public social event factor, such as, for example, dates of national events such as public holidays (e.g. July $4^{th}$), major sporting events (e.g., the Super Bowl), and the like, as well as local public events such as festivals, local sporting events, cultural events, and the like. In some approaches, one or more of the inputs for determining the public social event factor may be automatically obtained from published national and/or local holiday and events calendars, social media event postings, etc., while in other approaches one or more of the inputs may be added manually.

The control circuit 130 and/or the central control system 140 may utilize the historical factor, weather factor, customer social event factor, and public social event factor to determine an ice demand for an ice-making device 102 having a particular location. For instance, in one non-limiting and exemplary example, the system 100 may determine the demand for ice within a given period (e.g., within the next 7 days) for a given location by considering:

1. The historical demand for ice (i.e., the amount of ice purchased) for the given period in one or more previous years by customers residing within a certain distance from the ice-making device 102 (e.g., 10 miles, 20 miles, 30 miles, etc.);
2. The number of customers or their family members residing within a certain distance from the ice-making device 102 who have upcoming birthdays within the given period and/or the number of customer social events, family events, etc. scheduled within the given period by customers residing within a certain distance from the ice-making device 102 (e.g., 10 miles, 20 miles, 30 miles, etc.);
3. The actual and/or predicted weather and/or temperature of the area in which the ice-making device 102 is located, as well as the actual and/or predicted weather and/or temperature within a certain distance from the ice-making device 102 (e.g., 10 miles, 20 miles, 30 miles, etc.); and
4. Any national or local holidays, sporting events, festivals, or other public events within the given period within a certain distance from the ice-making device 102 (e.g., 10 miles, 20 miles, 30 miles, etc.).

It will be understood that in determining an ice demand for an ice-making device 102 at a particular location, each of the historical factor, weather factor, customer social event factor, and public social event factor may have varying degrees of significance in the analysis and may carry the same or different weight depending on the inputs used to determine each factor. Additionally, one or more of the inputs used to determine each factor may be geolocation-based to account for regional and local differences in buying habits, weather, social activity, scheduled events, etc., thereby increasing the prediction accuracy of the ice demand. For instance, an ice demand for one retail facility for a given week (e.g., in a rural town in Texas) may vastly differ from an ice demand for a retail facility in another location for the same week (e.g., in suburb of Chicago) due to differences in, for example, temperature/weather, customer buying and activity trends, local, cultural and/or social events, etc.

As described above, the control circuit 130 and/or the central control system 140 may utilize one or more of the historical factor, weather factor, customer social event factor, and public social event factor to predict an ice demand for a given day or period to determine an ice manufacturing quantity for the given day or period. In determining an ice manufacturing quantity, the control circuit 130 and/or the central control system 140 determines a beginning ice inventory at a first time. The beginning ice inventory may be determined based on data obtained from one or more sensors on, in, or associated with the ice making device 102 and/or the reservoir 104. Alternatively, or in addition, the beginning ice inventory may be determined based on the most recent ending ice inventory.

Predicting Average Demand

The control circuit 130 and/or the central control system 140 determines a predicted ice demand for a first period based on at least the historical factor, weather factor, customer social event factor, and public social event factor. In some approaches, the average ice demand may be predicted using a regression function using historical data (e.g., 3 years) and the variables listed below in Table 1, wherein the Average Demand D=f (DL, X, W, EM, EP, EC).

TABLE 1

Variables for determining average demand

| Variable | Description | Applicability |
| --- | --- | --- |
| X | Outside temperature | Weather factor |
| W | Weather (e.g., cloudy vs not cloudy, rain vs no rain, etc.) | Weather factor |
| EM | Number of customers with social events (generated based on previous purchases, customer input, etc.) | Customer social event factor |
| EP | Social public event factor, generated through historical spikes vs known events (e.g. July 4$^{th}$) | Public social event factor |
| EC | Variable factor for local events input by a local agent | Public social event factor |
| DL | Historic demand for given period from previous year(s) | Historical factor |

Determining Service Level

The control circuit 130 and/or the central control system 140 determines an ice manufacturing quantity based on at least the beginning ice inventory, the predicted ice demand, and a manufacturing capacity of the ice-making device 102. To determine the ice manufacturing quantity, it is desirable to understand the service level so that costs (and waste) can be minimized and efficiency maximized. The service level can be determined as described below.

$$x = \text{cost of understocking}/(\text{cost of overstocking} + \text{cost of understocking})$$

TABLE 2

Variables for determining service level

| Variable | Description |
| --- | --- |
| cost of understocking | =lost profit from sale of an ice bag |
| cost of overstocking | =incremental cost of capacity for one more bag (present value of total estimated units that can be sold, distributed to all units manufactured using the machine through its life) plus incremental cost of storage for each additional bag |

The inventory needed for a first period (ID1) can be determined as follows:

$$ID1 = \text{norm inv}(\text{probability } x, \text{average demand}, \text{st.dev. of demand})$$

This will determine the total demand, including an amount of safety stock.

Determining Ice Manufacturing Quantity for Given Period

In some approaches, the ice manufacturing quantity for a given period may be determined using the algorithms and variables described below.

TABLE 3

Variables for determining Ice Manufacturing Quantity

| Variable | Description |
| --- | --- |
| MC | production capacity |
| IM | Ice manufactured in given period (e.g., hourly periods 1, 2, etc.) |
| ID | Ice Demand including safety stock given period (e.g., hourly periods 1,2, etc.) |
| IB | Ice Beginning Inv given period (e.g., hourly periods 1, 2, etc.) |
| IE | Ice End Inventory in given period (e.g., hourly periods 1, 2, etc.) (IE1 = IB2) |

The target ice inventory at the beginning of period 2 (IB2) may be determined by the following equation:

$$IB1 + IM1 - ID1 = IE1 = IB2$$

However, it may be important to ensure that there is enough stock at the beginning of period 2 to achieve a minimum for period 3 with a limited manufacturing capacity (MC). Thus, the minimum ice inventory at the beginning of period 2 (Min IB2) may be determined using the following equation:

$$\text{Min } IB2 = IB3 + ID2 - MC$$

In view of the above, the amount of ice manufactured for period 1 (IM1) may be determined using the following equation:

$$IM1 = \text{Min } IB2 - IB1 + ID1$$

It will be understood that this is an iterative equation for which all future period demands can theoretically be calculated.

In some approaches, the storage capacity of the ice-making device 102, reservoir 104, and/or any additional storage freezers coupled thereto may also be taken into account when making one or more of the above determinations. In some approaches, an estimated energy cost of storing excess manufactured may be taken into account when making on or more of the above determinations. For example, the ice manufacturing quantity may be further determined based on an estimated energy cost of storing excess manufactured ice.

The control circuit 130 and/or the central control system 140, having determined the ice manufacturing quantity, communicates with the ice-making device 102 (either directly or indirectly) to cause the ice-making device 102 to produce an amount of ice consistent with the determined ice manufacturing quantity. The system 100 generates enough ice to fill the reservoir 104 and ceases ice manufacturing when the target inventory is achieved, thus reducing energy costs of keeping ice below freezing point. The steps and analyses described above may be repeated at fixed or variable intervals or as needed to maximize efficiency and minimize costs.

In some approaches, control circuit 130 and/or the central control system 140 may determine an ice ending inventory for period 2 (e.g., IE2). A lower than expected ice ending inventory for period 2 may prompt the control circuit 130 and/or the central control system 140 to increase ice manufacturing to achieve an acceptable inventory for period 3. In some approaches, if the ice ending inventory for period 2 is higher than expected, the control circuit 130 and/or the central control system 140 may vary the price of the excess manufactured ice depending on the estimated energy cost of storing the excess manufactured. As discussed above, it may be more cost- and/or energy-efficient to reduce the price of the excess ice rather than to store the ice for a period of time.

In some approaches, the system 100 may include an inventory database 120 communicatively coupled to the control circuit 130 and/or the central control system 140. The inventory database 120 may store, among other data, associations between related products, particularly with respect to products historically associated with a purchase of ice. For instance, the inventory database 120 may store data relating products that have been purchased together in the past (in the aggregate and/or in relating to particular customers), such as, for example, ice and hot dogs. The inventory database 120 may also store associations between products and special events such birthdays, sporting events, etc. When a customer selects an amount of ice or purchase via the user interface 106, the control circuit 130 and/or the central control system 140 queries the inventory database 120 to obtain a listing of products historically related to the purchase of ice, and the causes the user interface 106 to display one or more suggested items for purchase. The control circuit 130 and/or the central control system 140 may also query the customer database 116 to identify suggested products related to the purchase of ice based on the customer's purchase history.

Alternatively, or in addition, the control circuit 130 and/or the central control system 140 may base the related product suggestion(s) on the data used to determine the customer social event factor in the customer database 116 and/or the data used to determine the public social event factor in the public social event database 118. For instance, when a customer selects an amount of ice or purchase via the user interface 106, the control circuit 130 and/or the central control system 140 may query the customer database 116 and/or the public social event database 118 to ascertain if there are any upcoming customer-specific or public social events. For example, the control circuit 130 and/or the central control system 140 may query the customer database and obtain an indication that the customer's birthday is two days away. The control circuit 130 and/or the central control system 140 may then query the inventory database 120 for a listing of products related to birthdays and may cause the user interface 106 to display one or more suggested items for purchase relating to birthdays (e.g., ice cream).

The system 100 for producing and vending ice enables the production and vending of ice in an energy-efficient manner. The system 100 determines demand by simultaneously analyzing variables such as, for example, weather forecast, social events (parties, sporting events, holidays, etc.), historical buying patterns, demographic profiles, and/or location and manages the among of ice manufactured and stored to minimized energy usage and maximize efficiency.

FIG. 3 illustrates a simplified flow diagram of an exemplary process 300 of producing and vending ice in an energy-efficient manner, in accordance with some embodiments. The process 300 may be implemented using the energy-efficient system 100 for producing and vending ice described herein.

In step 302, an ice-making device configured to manufacture ice is provided, along with a reservoir coupled to the ice-making device and configured to store the ice manufactured by the ice-making device. The ice-making device may comprise any suitable device capable of making, producing, or otherwise manufacturing a quantity of ice and may include any components needed for making, producing, or otherwise manufacturing a quantity of ice including, for example, a self-contained refrigeration system, a water supply, a filtration system, a power source, etc. The reservoir may have any suitable size, shape, and configuration depending on the size, shape, configuration and/or ice-manufacturing capability of the ice-making device. In some approaches, the reservoir may be coupled to the ice-making device via a hopper, which conveys the manufactured ice from the ice-making device to the reservoir. The reservoir may also be insulated as appropriate and may be fitted with various sensors (e.g., temperature, weight, volume, etc.) which may transmit signals and/or data to the control circuit. The ice-making device and reservoir may comprise ice-making device 102 and reservoir 104 described herein with references to FIGS. 1 and 2. In some approaches, the ice-making device, reservoir, and a control circuit are housed in a standalone self-service kiosk located outside of a retail facility.

In step 304, a control circuit associated with the ice-making device determines a beginning ice inventory at a first time. The control circuit may comprise control circuit 130 and/or may form part of central control system 140, described herein with references to FIGS. 1 and 2. The beginning ice inventory may be determined based on, for example, data obtained from one or more sensors on, in, or associated with the ice making device and/or the reservoir. Alternatively, or in addition, the beginning ice inventory may be determined based on the most recent ending ice inventory.

In step 306, the control circuit determines a predicted ice demand for a first period, wherein the predicted ice demand is a function of at least a historical factor, a weather factor, a customer social event factor, and a public social event factor.

The historical factor may be determined using data relating to past ice demand, such as, for example, previous ice sales data for a given date or period, which may be stored in a historical database that is communicably coupled to the control circuit. This data may be provided to the historical database from, for example, point of service kiosks associated with the retailer, inventory management systems, etc.

The weather factor may be determined based on data relating to current and/or predicted temperature, weather, etc. for the location of and surrounding the ice-making device and may be collected and provided by a weather engine and stored in a weather database communicably coupled to the control circuit. The weather engine may include one or more outdoor sensors in the vicinity of the ice-making device, the outdoor sensors being configured to collect data relating to current and/or predicted temperature and/or weather in the vicinity of the ice-making device. Alternatively, or in addition, the weather engine may obtain current and/or predicted temperature and/or weather from one or more regional weather services.

The customer social event factor may be determined based on data comprising, for example, customers' purchase history, shopping habits, social activity calendar, etc., which may be stored in a customer database communicably coupled to the control circuit. In some approaches, the customer database may be electronically linked to customers' user accounts, membership accounts, loyalty accounts, etc. and may periodically obtain and store from those accounts data relating to customers' purchase history, shopping habits, etc. In some approaches, the customer may provide certain information to the retailer, such as for example, their address, date of birth. And in some approaches, customers may create an electronic customer profile, which includes a social event calendar comprising birthdays, social gatherings, family events, etc. Alternatively, or in addition, customers may elect to link their user accounts, membership accounts, loyalty accounts, etc. to one or more third party electronic calendar applications, social media applications, and the like, which may provide the customer database with data relating to birthdays, social gatherings, family events, etc.

The public social event factor is determined based on data, such as, for example, dates of national events such as public holidays (e.g. July $4^{th}$), major sporting events (e.g., the Super Bowl), and the like, as well as local public events such as festivals, local sporting events, cultural events, and the like. In some approaches, one or more of the inputs for determining the public social event factor may be automatically obtained from published national and/or local holiday and events calendars, social media event postings, etc., while in other approaches one or more of the inputs may be added manually. This data may be stored in a public social event database communicably coupled to the control circuit.

The historical database, weather engine, customer database, and public social event database may be communicatively coupled to the control circuit via a remote server.

In some approaches, the average ice demand may be predicted using a regression function as described above under the heading "Predicting Average Demand" and using the variables described in Table 1, wherein the Average Demand D=f (DL, X, W, EM, EP, EC). The control circuit uses the historical factor, weather factor, customer social event factor, and public social event factor to determine an ice demand for an ice-making device having a particular location. As such, one or more of the inputs for determining these factors may be geolocation-based. Each of these factors may also have varying degrees of significance in the analysis and may carry the same or different weight depending on the inputs used to determine each factor.

In step 308, the control circuit determines an ice manufacturing quantity based on the beginning ice inventory, the predicted ice demand, and a manufacturing capacity of the ice-making device. In some approaches, the ice manufacturing quantity may be determined as described above under the headings "Determining Service Level" and "Determining Ice Manufacturing Quantity for Given Period" and using the variables described in Tables 2 and 3. In some approaches, the ice manufacturing quantity may be further determined based on an estimated energy cost of storing excess manufactured ice.

In step 310, the ice-making device automatically produces an amount of ice, wherein the amount of ice produced is consistent with the determined ice manufacturing quantity. In some approaches, the control circuit may cause the ice-making device to produce the amount of ice needed. The system is configured to generate enough ice to fill the reservoir and to cease ice manufacturing when a target inventory is achieved. The steps and analyses described above may be repeated at fixed or variable intervals or as needed to maximize efficiency and minimize costs.

In some approaches, a user interface may be communicatively coupled to the control circuit. The interface may be configured to electronically display prices of various amounts of ice for purchase to allow a customer to select an amount of ice manufactured by the ice-making device. The user interface may comprise the user interface 106 described above with reference to FIGS. 1 and 2. In some approaches, the user interface may display a suggested item for purchase based on one or more of the data for determining the customer social event factor, the data for determining the public social event, and products historically associated with a purchase of ice. The products historically associated with a purchase of ice are stored and otherwise identified in an inventory database communicatively coupled to the control circuit associated with the ice-making device, as described above. Additionally, a payment system may be communicatively coupled to the control circuit and the user interface, the payment system configured to execute a payment transaction for the amount of ice selected by the customer. The payment system may comprise the payment system 108 described above with reference to FIGS. 1 and 2.

In optional step 312, the control circuit determines an ice ending inventory for the given period. In some approaches, a lower than expected ice ending inventory may prompt the control circuit to increase ice manufacturing to achieve an acceptable inventory for the next period. In some approaches, if the ice ending inventory is higher than expected, the control circuit may, in optional step 314, vary the price of the excess manufactured ice depending on the estimated energy cost of storing the excess manufactured and may display the varied price on the user interface. As discussed above, it may be more cost- and/or energy-efficient to reduce the price of the excess ice rather than to store the ice for a period of time.

In some approaches, the ice-making device and control circuit are further coupled to a packaging system configured to individually package amounts of ice manufactured by the ice-making device. The packaging system may also be coupled to reservoir, for example, by a dispensing arm. The packaging system may include any suitable components for packaging amounts of ice manufactured by the ice-making device. In some approaches, the packaging system may include an automated roll stock film system for packaging varying quantities of ice from the ice-making device and/or the reservoir continuously, periodically, or on-demand. In some approaches, the packaging system may include pre-made bags of one or more sizes which are filled with an amount of ice from the ice-making device and/or the reservoir. The packaging system is configured such that fresh manufactured ice can be packaged and sold in any weight format. For example, in some approaches, the packaging system is configured to package ice in bags of from about 2 to about 25 pounds of ice. The packaging system may comprise the packaging system 110 described above with reference to FIGS. 1 and 2.

In optional step 316, the control circuit provides an electronic instruction to the packaging system to individually package various amounts of manufactured ice based on one or more of the factors described herein associated with the predicted ice demand. For example, when certain conditions are met (or when the control circuit determines a need for bagged ice based on actual, predicted, or historical demand), the control circuit may cause the packaging system to package a certain number of bags of ice (which may contain the same or varying amounts of ice depending on the system employed) so that premade bags of ice are available for purchase during a particular period.

In optional step 318, the control circuit provides an electronic instruction to the packaging system to package a particular amount of manufactured ice based on a customer's selection via the user interface. For example, the control circuit may cause the packaging system to package a certain number of bags of ice (which may contain the same or varying amounts of ice depending on the system employed) in response to a purchase order from a customer received via the user interface.

Although steps 316 and 318 are depicted in FIG. 3 as following step 314, step 316 and/or step 318 may occur after any of steps 310, 312, or 314.

Further, the circuits, circuitry, systems, devices, processes, methods, techniques, functionality, services, servers, sources and the like described herein may be utilized, implemented and/or run on many different types of devices and/or systems. FIG. 4 illustrates an exemplary system 400 that may be used for implementing any of the components, circuits, circuitry, systems, functionality, databases, apparatuses, processes, or devices of the energy-efficient system 100 for producing and vending ice, the ice-making device 102, the control circuit 130, the central control system 140, the reservoir 104, the user interface 106, the payment system 108, the packaging system 110, the historical database 112, the weather engine 114, the customer database 116, the public social event database 118, the inventory database 120, and/or other above or below mentioned systems or devices, or parts of such circuits, circuitry, functionality, systems, apparatuses, processes, or devices. However, the use of the system 400 or any portion thereof is certainly not required.

By way of example, the system 400 may comprise a control circuit or processor module 412, memory 414, and one or more communication links, paths, buses or the like 418. Some embodiments may include one or more user interfaces 416, and/or one or more internal and/or external power sources or supplies 440. The control circuit 412 (which may form all or part of control circuit 130 and/or control circuit 141) can be implemented through one or more processors, microprocessors, central processing unit, logic, local digital storage, firmware, software, and/or other control hardware and/or software, and may be used to execute or assist in executing the steps of the processes, methods, functionality and techniques described herein, and control various communications, decisions, programs, content, listings, services, interfaces, logging, reporting, etc. Further, in some embodiments, the control circuit 412 can be part of control circuitry and/or a control system 410, which may be implemented through one or more processors with access to one or more memory 414 that can store instructions, code and the like that is implemented by the control circuit and/or processors to implement intended functionality. In some applications, the control circuit and/or memory may be distributed over a communications network (e.g., LAN, WAN, Internet) providing distributed and/or redundant processing and functionality. Again, the system 400 may be used to implement one or more of the above or below, or parts of, components, circuits, systems, processes and the like.

The user interface 416 can allow a user to interact with the system 400 and receive information through the system. In some instances, the user interface 416 includes a display 422 and/or one or more user inputs 424, such as buttons, touch screen, track ball, keyboard, mouse, etc., which can be part of or wired or wirelessly coupled with the system 400. Typically, the system 400 further includes one or more communication interfaces, ports, transceivers 420 and the like allowing the system 400 to communicate over a communication bus, a distributed computer and/or communication network 10 (e.g., a local area network (LAN), the Internet, wide area network (WAN), etc.), communication link 418, other networks or communication channels with other devices and/or other such communications or combination of two or more of such communication methods. Further the transceiver 420 can be configured for wired, wireless, optical, fiber optical cable, satellite, or other such communication configurations or combinations of two or more of such communications. Some embodiments include one or more input/output (I/O) ports 434 that allow one or more devices to couple with the system 400. The I/O ports can be substantially any relevant port or combinations of ports, such as but not limited to USB, Ethernet, or other such ports. The I/O interface 434 can be configured to allow wired and/or wireless communication coupling to external components. For example, the I/O interface can provide wired communication and/or wireless communication (e.g., Wi-Fi, Bluetooth, cellular, RF, and/or other such wireless communication), and in some instances may include any known wired and/or wireless interfacing device, circuit and/or connecting device, such as but not limited to one or more transmitters, receivers, transceivers, or combination of two or more of such devices.

In some embodiments, the system may include one or more sensors 426 to provide information to the system and/or sensor information that is communicated to another component, such as the control circuit 130, the central control system 140, etc. The sensors can include substantially any relevant sensor, such as distance measurement sensors (e.g., optical units, sound/ultrasound units, etc.), optical based scanning sensors to sense and read optical patterns (e.g., bar codes), weight sensors, volume sensors, and other such sensors. The foregoing examples are intended to be illustrative and are not intended to convey an exhaustive listing of all possible sensors. Instead, it will be understood that these teachings will accommodate sensing any of a wide variety of circumstances in a given application setting.

The system 400 comprises an example of a control and/or processor-based system with the control circuit 412. Again, the control circuit 412 can be implemented through one or more processors, controllers, central processing units, logic, software and the like. Further, in some implementations the control circuit 412 may provide multiprocessor functionality.

The memory 414, which can be accessed by the control circuit 412, typically includes one or more processor readable and/or computer readable media accessed by at least the control circuit 412, and can include volatile and/or nonvolatile media, such as RAM, ROM, EEPROM, flash memory and/or other memory technology. Further, the memory 414 is shown as internal to the control system 410; however, the memory 414 can be internal, external or a combination of internal and external memory. Similarly, some or all of the memory 414 can be internal, external or a combination of internal and external memory of the control circuit 412. The external memory can be substantially any relevant memory such as, but not limited to, solid-state storage devices or drives, hard drive, one or more of universal serial bus (USB) stick or drive, flash memory secure digital (SD) card, other memory cards, and other such memory or combinations of two or more of such memory, and some or all of the memory may be distributed at multiple locations over the computer network 10. The memory 414 can store code, software, executables, scripts, data, content, lists, programming, programs, log or history data, user information, customer information, product information, and the like. While FIG. 4 illustrates the various components being coupled together via a bus, it is understood that the various components may actually be coupled to the control circuit and/or one or more other components directly.

In some embodiments, energy-efficient systems for producing and vending ice are provided and corresponding methods performed by the systems. An energy-efficient system for producing and vending ice, in some embodiments, comprises: an ice-making device configured to manufacture ice; a reservoir coupled to the ice-making device and configured to store the ice manufactured by the ice-making device; and a control circuit communicatively coupled to the ice-making device, the control circuit configured to: determine a beginning ice inventory at a first time; determine a predicted ice demand for a first period, wherein the predicted ice demand is a function of at least a historical factor, a weather factor, a customer social event factor, and a public social event factor; determine an ice manufacturing quantity based on the beginning ice inventory, the predicted ice demand, and a manufacturing capacity of the ice-making device; and cause the ice-making device to produce an amount of ice consistent with the determined ice manufacturing quantity.

Some embodiments provide energy-efficient method of producing and vending ice, comprising: providing an ice-making device configured to manufacture ice and a reservoir coupled to the ice-making device and configured to store the ice manufactured by the ice-making device; determining, using a control circuit associated with the ice-making device, a beginning ice inventory at a first time; determining, using the control circuit, a predicted ice demand for a first period, wherein the predicted ice demand is a function of at least a historical factor, a weather factor, a customer social event factor, and a public social event factor; determining, using the control circuit, an ice manufacturing quantity based on the beginning ice inventory, the predicted ice demand, and a manufacturing capacity of the ice-making device; and automatically producing an amount of ice using the ice-making device, wherein the amount of ice produced is consistent with the determined ice manufacturing quantity.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. An energy-efficient system for producing and vending ice, the system comprising:
   an ice-making device configured to manufacture ice;
   a reservoir coupled to the ice-making device and configured to store the ice manufactured by the ice-making device; and
   a control circuit communicatively coupled to the ice-making device, the control circuit configured to:
   determine a beginning ice inventory at a first time;
   determine a predicted ice demand for a first period, wherein the predicted ice demand is a function of at least a historical factor, a weather factor, a customer social event factor, and a public social event factor;
   determine an ice manufacturing quantity based on the beginning ice inventory, the predicted ice demand, and a manufacturing capacity of the ice-making device; and
   cause the ice-making device to produce an amount of ice consistent with the determined ice manufacturing quantity.

2. The system of claim 1, wherein the ice manufacturing quantity is further determined based on an estimated energy cost of storing excess manufactured ice.

3. The system of claim 1, further comprising:
   a user interface communicatively coupled to the control circuit, the user interface configured to allow a customer to select an amount of ice manufactured by the ice-making device; and
   a payment system communicatively coupled to the control circuit and the user interface, the payment system configured to execute a payment transaction for the amount of ice selected by the customer.

4. The system of claim 3, wherein the control circuit is further configured to:
   determine an ending inventory at a second time; and
   vary a price of the manufactured ice displayed on the user interface based on the ending inventory and an estimated energy cost associated with storing the manufactured ice forming the ending inventory.

5. The system of claim 1, further comprising a packaging system coupled to the ice-making device and the control circuit, the packaging system configured to individually package amounts of ice manufactured by the ice-making device.

6. The system of claim 5, wherein the control circuit is further configured to instruct the packaging system to individually package various amounts of manufactured ice based on one or more of the factors associated with the predicted ice demand.

7. The system of claim 5, wherein the control circuit is further configured to instruct the packaging system to package a particular amount of manufactured ice based on a customer's selection via the user interface.

8. The system of claim 3, further comprising:
   a historical database comprising data relating to past ice demand for determining the historical factor;
   a weather engine configured to collect and provide data for determining the weather factor;
   a customer database comprising data for determining the customer social event factor; and
   a public social event database comprising data for determining the public social event factor;
   wherein the historical database, weather engine, customer database, and public social event database are communicatively coupled to the control circuit associated with the ice-making device via a remote server.

9. The system of claim 8, further comprising an inventory database communicatively coupled to the control circuit, wherein the inventory database identifies products historically associated with a purchase of ice, and the control circuit causes the user interface to display a suggested item for purchase based on one or more of the products historically associated with a purchase of ice, the data for determining the customer social event factor, and the data for determining the public social event factor.

10. The system of claim 1, wherein the ice-making device, reservoir, and control circuit are housed in a standalone self-service kiosk located outside of a retail facility.

11. An energy-efficient method of producing and vending ice, the method comprising:
   providing an ice-making device configured to manufacture ice and a reservoir coupled to the ice-making device and configured to store the ice manufactured by the ice-making device;
   determining, using a control circuit associated with the ice-making device, a beginning ice inventory at a first time;
   determining, using the control circuit, a predicted ice demand for a first period, wherein the predicted ice demand is a function of at least a historical factor, a weather factor, a customer social event factor, and a public social event factor;

determining, using the control circuit, an ice manufacturing quantity based on the beginning ice inventory, the predicted ice demand, and a manufacturing capacity of the ice-making device; and automatically producing an amount of ice using the ice-making device, wherein the amount of ice produced is consistent with the determined ice manufacturing quantity.

12. The method of claim 11, wherein the ice manufacturing quantity is further determined based on an estimated energy cost of storing excess manufactured ice.

13. The method of claim 11, wherein the ice-making device and control circuit are further coupled to:

a user interface communicatively coupled to the control circuit, the user interface configured to allow a customer to select an amount of ice manufactured by the ice-making device; and a payment system communicatively coupled to the control circuit and the user interface, the payment system configured to execute a payment transaction for the amount of ice selected by the customer.

14. The method of claim 13, further comprising:

determining, using the control circuit, an ending inventory at a second time; and automatically varying a price of the manufactured ice displayed on the user interface based on the ending inventory and an estimated energy cost associated with storing the manufactured ice forming the ending inventory.

15. The method of claim 11, wherein the ice-making device and control circuit are further coupled to a packaging system configured to individually package amounts of ice manufactured by the ice-making device.

16. The method of claim 15, further comprising providing an electronic instruction to the packaging system to individually package various amounts of manufactured ice based on one or more of the factors associated with the predicted ice demand.

17. The method of claim 15, further comprising providing an electronic instruction to the packaging system to package a particular amount of manufactured ice based on a customer's selection via the user interface.

18. The method of claim 13, wherein the control circuit associated with the ice-making device is communicatively coupled, via a remote server, to:

a historical database comprising data relating to past ice demand for determining the historical factor;

a weather engine configured to collect and provide data for determining the weather factor;

a customer database comprising data for determining the customer social event factor; and a public social event database comprising data for determining the public social event factor.

19. The method of claim 18, further comprising electronically displaying on the user interface a suggested item for purchase based on one or more of the data for determining the customer social event factor, the data for determining the public social event factor, and products historically associated with a purchase of ice, wherein the products historically associated with a purchase of ice are identified in an inventory database communicatively coupled to the control circuit associated with the ice-making device.

20. The method of claim 11, wherein the ice-making device, reservoir, and control circuit are housed in a stand-alone self-service kiosk located outside of a retail facility.

* * * * *